(12) United States Patent
Bergweiler

(10) Patent No.: US 10,391,901 B2
(45) Date of Patent: Aug. 27, 2019

(54) PASSIVE SEAT VENTILATION SYSTEM

(71) Applicant: DENSO International America, Inc., Southfield, MI (US)

(72) Inventor: Alec Bergweiler, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 313 days.

(21) Appl. No.: 15/432,563

(22) Filed: Feb. 14, 2017

(65) Prior Publication Data

US 2018/0229633 A1  Aug. 16, 2018

(51) Int. Cl.

| | |
|---|---|
| *B60N 2/56* | (2006.01) |
| *B60N 2/58* | (2006.01) |
| *B64D 11/06* | (2006.01) |
| *A47C 7/74* | (2006.01) |
| *B60N 2/90* | (2018.01) |
| *B60N 2/60* | (2006.01) |
| *B60N 2/70* | (2006.01) |
| *B60N 2/02* | (2006.01) |

(52) U.S. Cl.
CPC ............ *B60N 2/5664* (2013.01); *A47C 7/742* (2013.01); *B60N 2/5635* (2013.01); *B60N 2/5642* (2013.01); *B60N 2/58* (2013.01); *B60N 2/60* (2013.01); *B60N 2/7011* (2013.01); *B60N 2/919* (2018.02); *B64D 11/0626* (2014.12); *B60N 2002/0268* (2013.01); *B60N 2002/924* (2018.02)

(58) Field of Classification Search
CPC .. B60N 2/5621; B60N 2/5642; B60N 2/5664; B60N 2/56; B60N 2/58; B60N 2/0244; B60N 2/22; B60N 2/64; B60N 2/66; B60N 2/919; B60N 2002/0268; B60N 2002/924; B64D 11/0626; B64D 11/0639; B64D 11/0647; A47C 7/742
See application file for complete search history.

(56) References Cited

U.S. PATENT DOCUMENTS

| | | | | |
|---|---|---|---|---|
| 3,804,462 | A | * | 4/1974 | Kobayashi ............. A47C 7/425 297/452.43 |
| 4,712,834 | A | * | 12/1987 | Warrick ................... A47C 7/14 244/122 R |
| 5,411,318 | A | * | 5/1995 | Law ......................... A47C 7/74 297/180.11 |

(Continued)

FOREIGN PATENT DOCUMENTS

| | | | |
|---|---|---|---|
| DE | 102012201430 A1 * | 4/2013 | ............... B60N 2/66 |
| EP | 2626239 A1 | 8/2013 | |

(Continued)

*Primary Examiner* — Ryan D Kwiecinski
(74) *Attorney, Agent, or Firm* — Harness, Dickey & Pierce, P.L.C.

(57) ABSTRACT

A seat including an exterior seat surface. The exterior seat surface is movable inward and outward relative to an interior of the seat. A flexible material overlays the exterior seat surface. The flexible material is lockable to restrict movement of the flexible material towards the exterior seat surface. Movement of the exterior seat surface into the seat defines a gap between the exterior seat surface and the flexible material to permit air to circulate between the exterior seat surface and the flexible material to cool an occupant of the seat.

19 Claims, 3 Drawing Sheets

(56) References Cited

U.S. PATENT DOCUMENTS

| | | | | |
|---|---|---|---|---|
| 6,231,125 B1 * | 5/2001 | Maeda | ................... | A47C 7/282 |
| | | | | 297/452.56 |
| 7,037,278 B2 * | 5/2006 | Dabir | ..................... | A61H 7/001 |
| | | | | 297/452.45 |
| 2006/0175889 A1 * | 8/2006 | Fridd | ...................... | B60N 2/66 |
| | | | | 297/464 |
| 2007/0057556 A1 * | 3/2007 | Kang | ....................... | A47C 7/38 |
| | | | | 297/354.1 |
| 2013/0106148 A1 | 5/2013 | Lazanja et al. | | |
| 2016/0031351 A1 * | 2/2016 | Galbreath | ................ | B60N 2/64 |
| | | | | 297/284.1 |

FOREIGN PATENT DOCUMENTS

| | | | | |
|---|---|---|---|---|
| WO | WO-9605475 A1 * | 2/1996 | ............... | A47C 7/74 |
| WO | WO-2015141197 A1 * | 9/2015 | ........... | B60N 2/5642 |

\* cited by examiner

PASSIVE SEAT VENTILATION SYSTEM

FIELD

The present disclosure relates to a seat ventilation system.

BACKGROUND

This section provides background information related to the present disclosure, which is not necessarily prior art.

Cabin comfort technologies are becoming more and more important to consumers, and to manufacturers looking to add a competitive advantage to their products. A number of these technologies are directed to climate control. While current climate control technologies are often adequate to improve occupant comfort, they typically result in a reduction in fuel economy. Exemplary climate control devices include auxiliary heaters, heated/cooled/ventilated seats, four zone climate control, etc. With respect to ventilated or cooled seats, they typically include an extra blower motor and ducting, which increases energy consumption and adds both complexity and expense to the seat. It would therefore be desirable to have a seat that is able to facilitate passenger cooling in a more efficient manner. The present teachings advantageously provide for a seat ventilation system that addresses these needs in the art, as well as numerous others.

SUMMARY

This section provides a general summary of the disclosure, and is not a comprehensive disclosure of its full scope or all of its features.

The present teachings provide for a seat including an exterior seat surface. The exterior seat surface is movable inward and outward relative to an interior of the seat. A flexible material overlays the exterior seat surface. The flexible material is lockable to restrict movement of the flexible material towards the exterior seat surface. Movement of the exterior seat surface into the seat defines a gap between the exterior seat surface and the flexible material to permit air to circulate between the exterior seat surface and the flexible material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
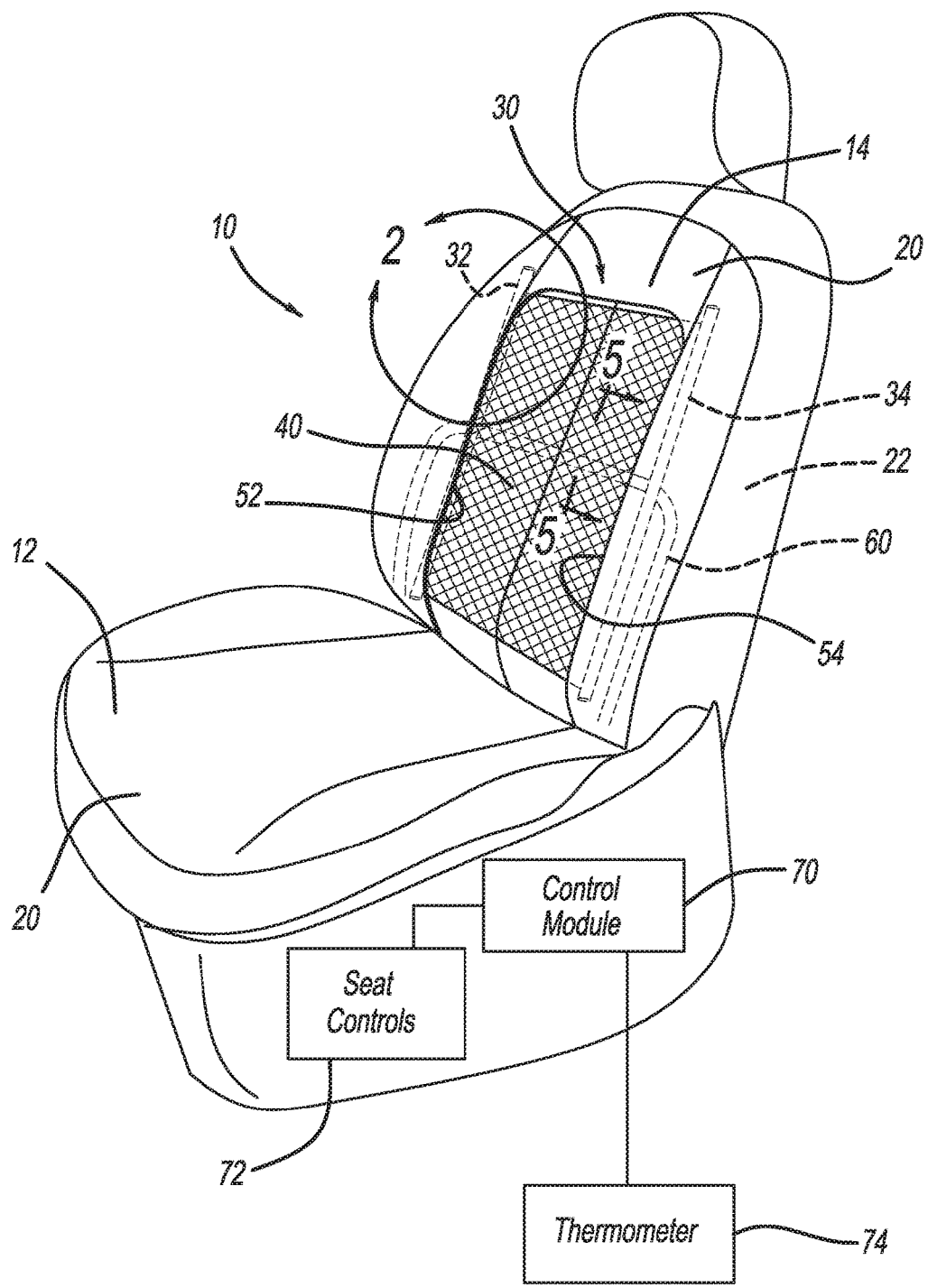
FIG. 1 is a perspective view of an exemplary seat according to the present teachings.

With initial reference to FIG. 1, an exemplary seat according to the present teachings is illustrated at reference numeral 10. The seat 10 can be any suitable type of seat, such as a vehicle seat. Exemplary vehicle seats include passenger car seats, utility vehicle seats, all-terrain vehicle seats, mass transit seats, construction vehicle/equipment seats, military vehicle/equipment seats, aircraft seats, etc. The seat 10 can also be any suitable non-vehicle seat, such as a seat for home, office, public, and/or commercial use. The seat 10 can be included with a chair, sofa, etc.

The exemplary seat 10 generally includes a seat base 12 and a seat back 14. The seat 10 includes an exterior or outer seat surface 20, which covers an interior 22 of the seat 10 at both the seat base 12 and the seat back 14. The exterior seat surface 20 can be made of any suitable material, such as any suitable natural and/or synthetic material. Exemplary natural materials include leather, and exemplary synthetic materials include cloth and any other suitable fabric.

Figure 2:
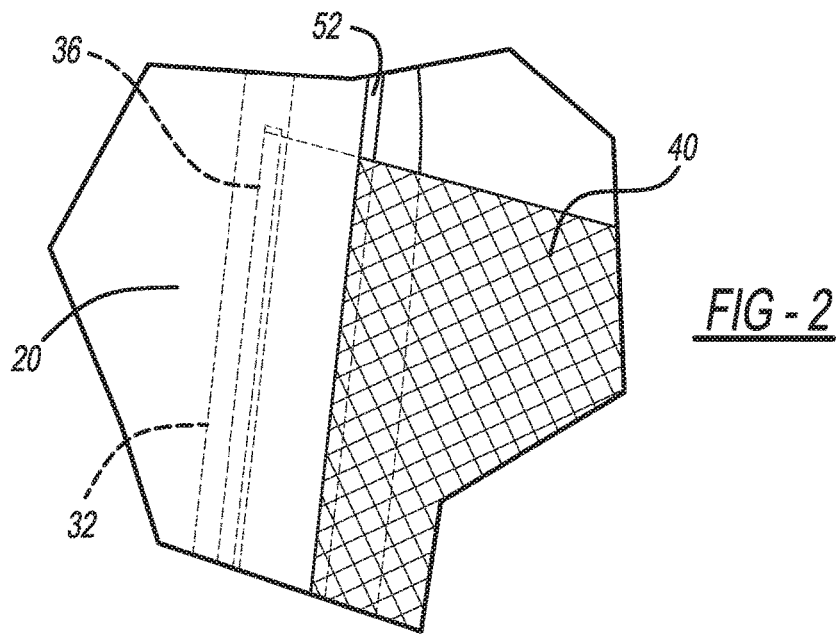
FIG. 2 illustrates area 2 of FIG. 1.
Figure 3:
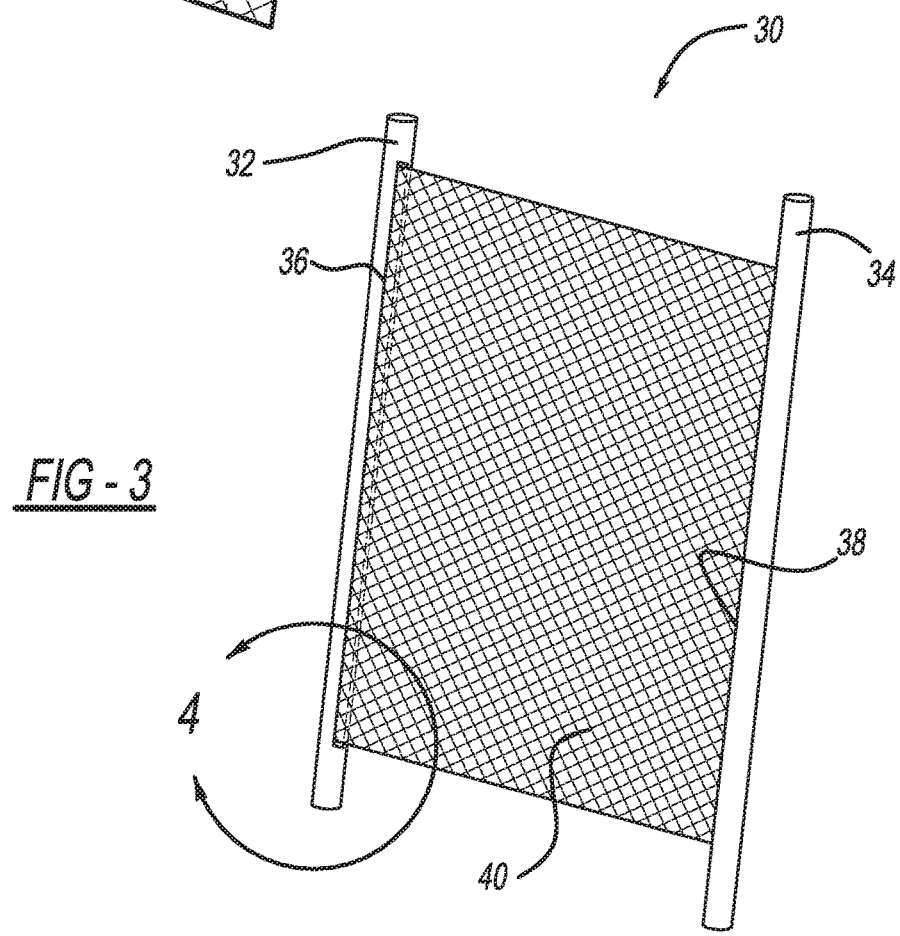
FIG. 3 illustrates a support assembly of the seat of FIG. 1.

With continued reference to FIG. 1, and additional reference to FIGS. 2 and 3, the seat 10 includes a support assembly 30. The support assembly 30 includes a first support or rail 32 and a second support or rail 34. Extending between the first and second rails 32 and 34 is any suitable support material, which in the example illustrated is a flexible material in the form of a mesh 40. The mesh 40 can be any suitable type of mesh material configured to permit the flow of air therethrough.

Figure 4:
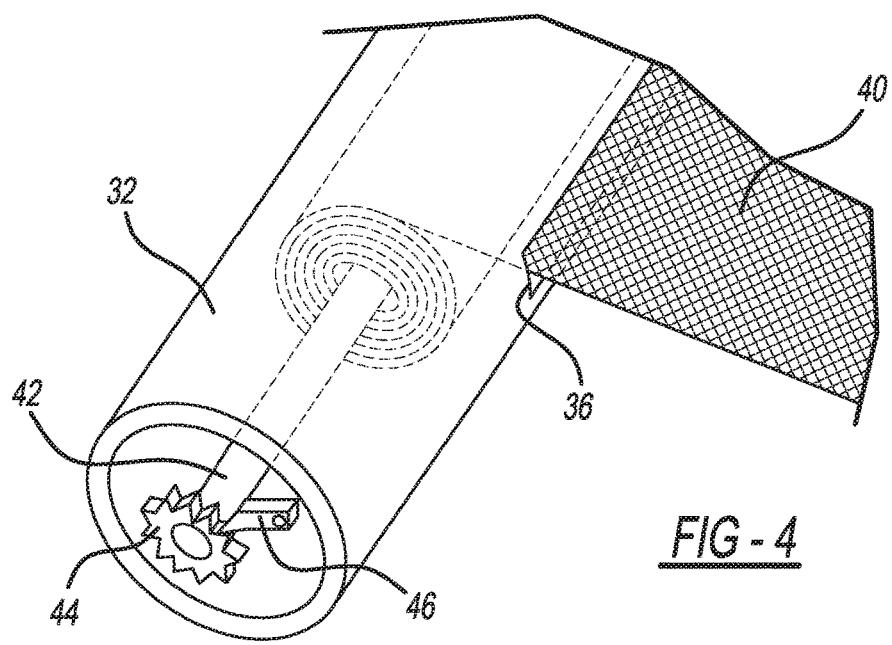
FIG. 4 illustrates area 4 of FIG. 3.

Each one of the first and second rails 32 and 34 defines an opening through which the mesh 40 extends, such as the opening 36 of the first rail 32 illustrated in FIGS. 2 and 4. The mesh 40 is secured within the first and second rails 32 and 34 in any suitable manner. For example, at least one of the first and second rails 32 and 34 can include any suitable locking mechanism. In an unlocked configuration, the locking mechanism allows additional portions of the mesh 40 to be drawn out from within at least one of the first or second rails 32 and 34. In a locked configuration, the locking mechanism restricts additional mesh material 40 from extending out from within the first and/or second rails 32, 34.

An exemplary locking mechanism is illustrated in FIG. 4. The locking mechanism generally includes a rod 42, a toothed gear 44, and a latch 46. The mesh 40 is wound onto the rod 42 upon rotation of the rod 42, and can be unwound from the rod 42 by opposite rotation of the rod 42 or pressure being applied to the mesh 40 by an occupant of the seat 10 when the rod 42 is unlocked. To lock the rod 42, the latch 46 is moved into engagement with the teeth of the toothed gear 44. The rod 42 and the latch 46 can be moved manually, or by an automated process. The locking mechanism of FIG. 4 is provided for exemplary purposes only, and any suitable locking mechanism can be used.

The support assembly 30 can be arranged at the seat back 14 as illustrated in FIG. 1, or may be arranged at the seat base 12 as well. In some applications, the seat 10 may include separate support assemblies 30 at both the sear back 14 and the seat base 12. In the example illustrated in FIG. 1, the support assembly 30 is arranged such that the first and second rails 32 and 34 are mounted on opposite sides of the seat 10 so that they extend generally parallel to one another.

Proximate to the first rail 32 is a first slit 52 defined by the exterior seat surface 20 (see FIGS. 1 and 4 for example). Proximate to the second rail 34 is a second slit 54 defined by the exterior seat surface 20 (see FIG. 1). The first and second slits 52 and 54 extend generally parallel to one another. The mesh 40 extends from the first rail 32, through the first slit 52 of the exterior seat surface 20 across a portion of the exterior seat surface 20, back into the interior 22 of the seat 10 through the second slit 54, and into the second rail 34. Thus the mesh 40 overlays a portion of the exterior seat surface 20 between the first slit 52 and the second slit 54.

The seat 10 further includes an interior support, which can be provided within the seat base 12, the seat back 14, or both the seat base 12 and the seat back 14. In the example illustrated in FIG. 1, the interior support is a lumbar support 60. The lumbar support 60 is any suitable type of support mechanism, device, and/or structure configured to provide support to the lumbar area of the person seated upon the seat 10.

Figures 5, 6:
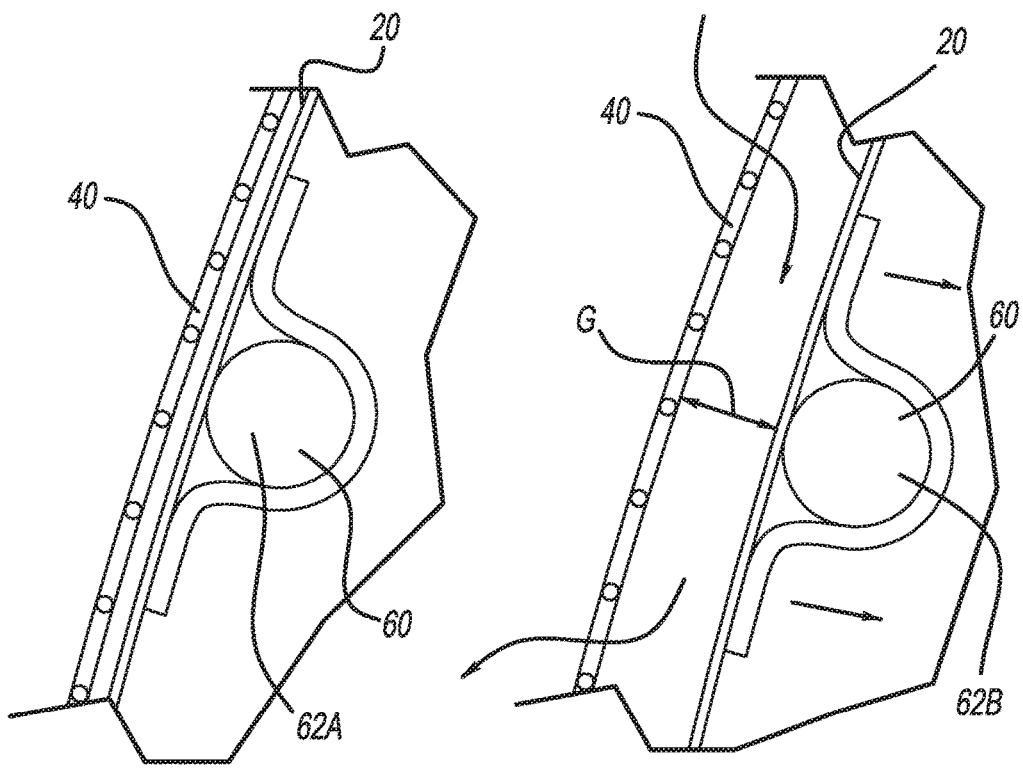
FIG. 5 is a cross-sectional view taken along line 5-5 of FIG. 1 with a lumbar support of the seat in an extended position.
FIG. 6 is a cross-sectional view similar to FIG. 5, but with the lumbar support of the seat in a retracted position.

The lumbar support 60 is movable to different positions. FIG. 5 illustrates the lumbar support 60 in an extended position 62A. FIG. 6 illustrates the lumbar support 60 in a retracted position 62B. The lumbar support 60 can be arranged at any suitable intermediate position as well. In the extended position 62A of FIG. 5, the lumbar support 60 provides maximum support to the seat occupant. In the retracted position 62B of FIG. 6, the lumbar support 60 is recessed further within the interior 22 of the seat 10 to provide less support to the seat occupant. In an intermediate position between positions 62A and 62B, the lumbar support 60 provides an intermediate level of support to the seat occupant. The lumbar support 60 is connected directly or indirectly to the exterior seat surface 20 of the seat 10, such that the exterior seat surface 20 moves with the lumbar support 60. For example, movement of the lumbar support 60 to the retracted position 62B draws the exterior seat surface 20 inward so as to define a gap G between the exterior seat surface 20 and the mesh 40. In addition to the extended and retracted positions 62A and 62B, the lumbar support 60 can be moved to any other suitable position.

When the lumbar support 60 is moved to the retracted position 62B to define the gap G between the exterior seat surface 20 and the mesh 40, the seat occupant's back is supported by the mesh 40 and does not contact the exterior seat surface 20. The support assembly 30 can be arranged in the locked configuration so that pressure upon the mesh 40 by the seat occupant does not cause the mesh 40 to move inward against the exterior seat surface 20. The gap G advantageously allows airflow to circulate between the exterior seat surface 20 and the mesh 40 to facilitate cooling of the seat occupant's back. Specifically, airflow can enter the gap G and pass through the mesh 40 to the seat occupant's back in order to cool the seat occupant's back.

A person's back is usually one of the last parts of the body to feel comfortable as the environment, such as the interior passenger cabin of a vehicle, is cooled. The human body relies on evaporation of sweat for cooling. Since the back is typically in direct contact with existing seats, it is not possible for sweat to evaporate and cool the person's back. By holding the person's back away from the exterior seat surface 20 with the mesh 40, airflow can reach the seat occupant's back to facilitate the normal evaporation process.

The seat 10 can further include a control module 70. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the control module 70. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 70 is in communication with any suitable seat control 72, and optionally a thermometer 74. The seat control 72 may be any suitable type of seat controls that allow the seat occupant to position the lumbar support 60, or any other interior support of the seat 10, and control the locking and unlocking of the support assembly 30, and specifically the mesh 40 thereof. The thermometer 74 is configured to measure temperature of the environment about the seat 10, such as within a vehicle passenger cabin or outside of the vehicle.

Using the seat controls 72 the seat occupant can manually actuate the lumbar support 60 and lock/unlock the mesh 40, or select an automatic mode. In the automatic mode, the control module 70 is configured to lock the mesh 40 and retract the lumbar support 60, such as to the retracted position 62B or any other suitable position resulting in the gap G of any suitable size, when the temperature measured by the thermometer 74 is greater than a predetermined temperature. When the temperature measured by the thermometer 74 is not greater than the predetermined temperature, the control module 70 will unlock the mesh 40. With the mesh 40 unlocked, if the seat occupant actuates the lumbar support 60, such as by using seat control 72, to retracted position 62B or any other position in which the exterior seat surface 20 is moved inward, pressure by the seat occupant against the mesh 40 will move the mesh 40 inward such that the mesh 40 is against the exterior seat surface 20. Thus the seat occupant can advantageously adjust the lumbar support 60 to best support his or her back and be directly supported by the exterior seat surface 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a,", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A seat comprising:
an exterior seat surface movable inward and outward relative to an interior of the seat; and
a flexible material overlaying the exterior seat surface, the flexible material is lockable to restrict movement of the flexible material towards the exterior seat surface;
wherein movement of the exterior seat surface into the seat defines a gap between the exterior seat surface and the flexible material to permit air to circulate between the exterior seat surface and the flexible material to cool an occupant of the seat;
wherein the flexible material is anchored at opposite ends to a first rail and a second rail within the seat; and
wherein the flexible material extends through a first slit defined by the exterior seat surface proximate to the first rail, and a second slit defined by the exterior seat surface proximate to the second rail.

2. The seat of claim 1, wherein the exterior seat surface is a seat back of the seat, and the flexible material extends over the seat back to support a back of a person seated on the seat.

3. The seat of claim 1, wherein the exterior seat surface is a seat base of the seat, and the flexible material extends over the seat base of the seat to support a bottom of a person seated on the seat.

4. The seat of claim 1, wherein the flexible material is a mesh.

5. The seat of claim 1, wherein the first rail extends generally parallel to the second rail, and the first and second rails are spaced apart on opposite sides of the seat.

6. The seat of claim 1, further comprising an interior support movable into the seat, movement of the interior support into the seat draws the exterior seat surface inward relative to an interior of the seat.

7. The seat of claim 6, wherein the interior support is a lumbar support.

8. The seat of claim 1, wherein the seat is a vehicle seat.

9. A seat comprising:
an interior support that is movable into the seat;
an exterior seat surface covering the interior support; and
an exterior support assembly including a flexible material overlaying the exterior seat surface, the exterior support assembly including a locked configuration in which movement of the flexible material towards the exterior seat surface is restricted;
wherein movement of the interior support into the seat draws the exterior seat surface away from the flexible material to define a gap between the exterior seat surface and the flexible material to permit air to circulate between the exterior seat surface and the flexible material.

10. The seat of claim 9, wherein the exterior seat surface is connected to the interior support.

11. The seat of claim 9, wherein the flexible material of the exterior support assembly includes a mesh material.

12. The seat of claim 9, wherein the exterior support assembly is anchored within the seat.

13. The seat of claim 9, wherein:
the exterior support assembly includes a first rail and a second rail;
the flexible material is anchored within the first rail and the second rail;
in the locked configuration, the exterior support assembly locks the mesh at at least one of the first rail and the second rail so that an additional portion of the flexible material is unable to extend out from within the first rail and the second rail; and
in an unlocked configuration, an additional portion of the flexible material is able to extend out from within at least one of the first and second rails to allow movement of the flexible material towards the exterior seat surface when the interior support is moved into the seat.

14. The seat of claim 13, wherein:
the first rail and the second rail are anchored within the seat beneath the exterior fabric;
the exterior seat surface defines a first slit proximate to the first rail and a second slit proximate to the second rail; and
the flexible material extends from the first rail through the first slit, across the exterior seat surface to the second slit, and through the second slit to the second rail.

15. The seat of claim 14, wherein the first rail and the second rail extend parallel to one another, and are spaced apart on opposite sides of the seat.

16. The seat of claim 9, wherein:
the interior support is a lumbar support; and
the exterior support assembly is mounted to a seat back of the seat.

17. The seat of claim 9, wherein:
the interior support is a seat base support; and
the exterior support assembly is mounted to a seat base of the seat.

18. The seat of claim 9, further comprising:
a control module associated with the seat; and
a thermometer configured to measure temperature of the seat or an environment about the seat, and configured to input the measured temperature to the control unit;
wherein when the measured temperature exceeds a pre-determined threshold, the control module locks the exterior support assembly in the locked configuration and moves the interior support into the seat to draw the exterior seat surface away from the flexible material and define the gap between the exterior seat surface and the flexible material.

19. The seat of claim 9, wherein the seat is a vehicle seat.

* * * * *

UNITED STATES PATENT AND TRADEMARK OFFICE
CERTIFICATE OF CORRECTION

| | | |
|---|---|---|
| PATENT NO. | : 10,391,901 B2 | Page 1 of 1 |
| APPLICATION NO. | : 15/432563 | |
| DATED | : August 27, 2019 | |
| INVENTOR(S) | : Alec Bergweiler | |

It is certified that error appears in the above-identified patent and that said Letters Patent is hereby corrected as shown below:

In the Claims

Column 6, Claim 13, Line 61: delete "at at" and insert --at-- therefor

Signed and Sealed this
Twenty-fifth Day of February, 2020

Andrei Iancu
*Director of the United States Patent and Trademark Office*